United States Patent [19]

Burkett

[11] 4,069,424

[45] Jan. 17, 1978

[54] SHAFT TURNING PARKING BUS FOR MULTIPLE UNIT INSTALLATIONS UTILIZING A SINGLE MOTORIZED GENERATOR CONTROL SYSTEM

[75] Inventor: Jerry D. Burkett, Hopewell Junction, N.Y.

[73] Assignee: Turbodyne Corporation (Gas Turbine Div.), Saint Cloud, Minn.

[21] Appl. No.: 684,570

[22] Filed: May 10, 1976

[51] Int. Cl.² .............................................. H02J 3/00
[52] U.S. Cl. ....................................... 307/87; 290/52
[58] Field of Search .................... 290/40 A, 40 B, 52; 307/25, 27, 64, 72, , 73, 87

[56] References Cited

U.S. PATENT DOCUMENTS

| | | | |
|---|---|---|---|
| 3,543,038 | 11/1970 | Putz et al. | 290/52 |
| 3,753,002 | 8/1973 | Jacobsen et al. | 307/87 |
| 3,764,815 | 10/1973 | Habock et al. | 290/52 |

*Primary Examiner*—Robert K. Schaefer
*Assistant Examiner*—Eugene S. Indyk
*Attorney, Agent, or Firm*—Daniel H. Bobis

[57] ABSTRACT

In an electrical power generating installation which includes a plurality of turbine-generator sets, a parking bus is disclosed, which is provided with a potential regulated at a relatively low and constant frequency of the order of 1-2 Hz. Switching and phase and frequency matching means are provided, which enable the same controlled variable frequency starting system used for start-up of the turbine-generator sets, to be used for gradually adjusting the rotational speed of a selected turbine-generator set to a point where phase and frequency may be matched with that of the parking bus, to then permit the generator member of such set to be electrically transferred to the bus. By means of such arrangement, any number of turbine-generator sets may be connected in parallel to the parking bus which thereupon effects a simultaneous, continued low speed rotation of the sets for cooling or other purposes. The sophisticated, complex, and costly start-up system, is thus freed of any requirement for continuing rotation of the sets during the long cool-down period, whereby in typical installations but a single such start-up system is required.

11 Claims, 1 Drawing Figure

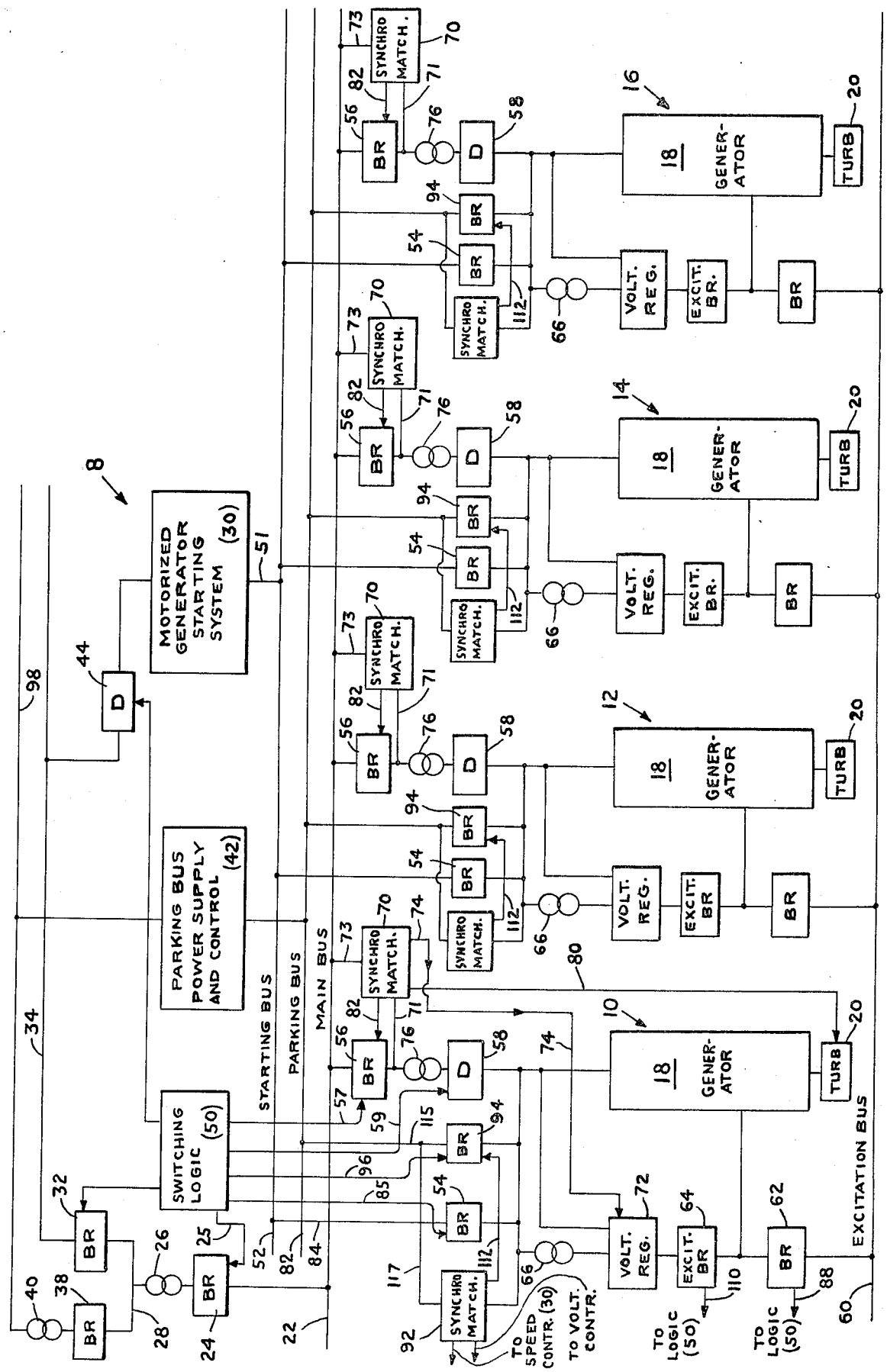

SHAFT TURNING PARKING BUS FOR MULTIPLE UNIT INSTALLATIONS UTILIZING A SINGLE MOTORIZED GENERATOR CONTROL SYSTEM

BACKGROUND OF INVENTION

This invention relates generally to electrical power generating systems, and more specifically relates to power generating facilities which include a plurality of turbine-generator sets.

Industrial gas turbine-generator sets, such as are used in modern electrical power generating facilities, require some type of auxiliary input power for enabling start-up from a rest (or 0 rpm) condition, to that rotational speed where the gas turbine produces sufficient power to sustain its own operation —and then accelerate to full operating speed. The start-up period for a typical such set is of the order of 10 minutes, and e.g., for a turbine having a power rating of 50,000 kilowats, the starting power is about 1200 hp. It has been well-known in the past to develop this auxiliary starting power by using an induction motor, which drives the set through a torque converter.

More recently, however, it has come to be recognized that the power required for start-up purposes may be produced by operating the generator member of the set as a synchronous motor. Reference may be usefully had in this connection, to U.S. Pat. No. 3,764,815 — which generally discloses a technique of this type being utilized for starting up gas turbines, pump storage units and the like.

In order to motorize the generator member of the set in the manner indicated, a frequency converter is required. Such system basically functions to convert the fixed AC 60 Hz grid frequency to DC; and then the DC is converted to alternating current at a frequency from zero to an upper design limit, as determined by a variable frequency control system. The main components of such system are the rectifiers (such as thyristors), and the control system for regulating the firing rate of the thyristors — or the output rate of such other elements as may be used. As is well-known to those skilled in the present art, these frequency conversion systems are complex and very costly.

In addition, to the start-up requirement which has thus far been discussed, a particular problem arises when the operating turbine-generator set is to be shut down. In particular, as is known to those familiar with the present art, it is necessary during such shut-down, to rotate the shaft at a low speed for a sustained period, in order to maintain the uniform temperature distribution until the immense quantities of residual heat have been dissipated. The required shaft-turning period can be as long as 30 hours or more, depending upon the specifics of the set. The shaft-turning power thus required for a typical 50,000 KW set is, however, only of the order of 5 hp at about 60 rpm.

The motorized generator start-up system, in addition to effecting its start-up function could, of course, also be used to drive the shaft at low speed for the cool-down cycle. Such arrangement would, in particular, be perfectly acceptable in an installation where but a single turbine-generator set is present.

In power plant installations containing a plurality of turbine-generator sets, however, a more complex and previously unmanageable problem is presented. In particular, a single motorized generator starting system can be used for starting each unit one at a time. However, if this starting system is also to be used as a low speed turning system for shaft cooling, then the number of units to be operated from one control system is limited to two sets. The reason for this limitation is due to the shaft-turning function and not the starting function, in that the starting of multiple units can be effected serially in time; but it may be necessary to provide a capability of having all units in an installation on a low speed shaft turning configuration, simultaneously.

In addition, the start-up system must be sufficiently flexible to allow interrupting the low speed turning function of the multiple units for start-up of any one of the turbine-generator sets.

It may be further noted, that where the number of turbine-generator sets are no more than two, a single motorized generator starting system can be used to start each unit serially in time. Should both units in this instance be shut down at the same time then it would obviously be necessary for both units to be operated in parallel during the cooling period. With two units, this can be accomplished by connecting the start-up system to drive the first set while still permitting the second set to coast down. A shaft position indicator on the first set can signal its pole position and speed to a synchronizing device, which simultaneously monitors the output of the start-up system, and then connects the second in parallel with the first upon synchronization of frequency and phase being attained. Thereafter both units can be operated in parallel.

The aforementioned scheme however, is complicated and may not be employed where more than two units are present. This may be appreciated if one considers the case where three turbine-generator sets have been shut down together, and each is decelerating at its own, slightly different rate. The signal for the pole position of generator B could be monitored and unit A brought to synchronization with unit B, but there is no way to assure that unit C could be similarly treated. Were the coast-down characteristics of the units precisely identical, then unit C could be synchronized by disconnecting units A and B while they were rotating in synchronization, and using the start-up control to bring unit C also into phase. However, the characteristics of the units are known not to be that closely related.

In accordance with the foregoing, it may be regarded as an object of the present invention, to provide a relatively simple system, which enables a single motorized generator start-up system, to start up the turbine-generator sets of an installation including a plurality of such sets; and which, further, enables transfer of any number of such sets to low speed shaft-turning configurations, without a requirement for additional variable frequency power supplies and attendant circuitry and components.

If is a further object of the present invention, to provide a system for use in power installations of the type including a plurality of turbine-generator sets, wherein any number of the turbine-generator sets may be placed and maintained at a low speed configuration for cooling or other purposes; and wherein such result is achieved by the use of subsystems of low cost and complexity.

SUMMARY OF THE INVENTION

Now, in accordance with the present invention, the foregoing objects, and others as will become apparent in the course of the ensuing specification, are achieved by use of a parking bus to which is provided a potential regulated at a relatively low and constant frequency of the order of 1-2 Hz. Switching, and phase and frequency matching means are provided, which enable the same motorized generator start-up system used for start-up of the turbine-generator sets, to be used to gradually adjust the rotational speed of a selected set, to that point where the phase and frequency of such set may be matched with that of the parking bus. The generator member of such set is then electrically transferred to the parking bus. By means of such arrangement, any number of turbine-generator sets may be connected in parallel to the parking bus which thereupon effects a simultaneous, continued low speed rotation of the sets, for cooling or other purposes. The sophisticated, complex and expensive motorized generator start-up system is thus freed of any requirement for continuing rotation of the turbine-generator sets during the long cool-down period, whereby in typical installations but a single such start-up system is required. It, of course, will be obvious that additional start-up systems may, if desired, be provided in parallel of a standby in multiple turbine installations.

It will similarly be evident, that turbine-generator sets parked upon the parking bus need not necessarily be brought to a condition of rest before being re-accelerated to a full operating speed. Thus the parked units can, at any time, be re-connected to the motorized generator start-up system, and reaccelerated to a speed at which the turbine operation becomes self-sustained.

BRIEF DESCRIPTION OF DRAWING

The invention is diagrammatically illustrated, by way of example, in the drawing appended hereto, in which:

The FIGURE is an electrical block diagram, schematic in nature, illustrating operation of a system in accordance with the present invention.

DESCRIPTION OF PREFERRED EMBODIMENT

In the FIGURE a schematic block diagram is set forth of a system 8, incorporating the features of the present invention.

System 8 is illustratively shown as including a series of four turbine-generator sets 10, 12, 14 and 16; in practice a greater or smaller number of such sets could be provided. These several turbine-generator sets may be considered as all present at a single power plant; and in accordance with prior discussion, it may be desired from time to time to actuate and place differing of the said sets on the external power network for transmission of electric power thereto. Similarly, it will from time to time, be desired to place one or more of the said sets in a low speed shaft-turning configuration, for purposes of permitting cool-down, as part of the shut-down process for such set. The various connections to the sets 10, 12, 14 and 16 are largely identical, and identical principles of operation apply to the actuating sequence for each set. Accordingly corresponding reference numerals are used herein to identify corresponding elements in the portions of system 8 applicable to each side set.

The said turbine-generator sets, each consisting of a a generator 18 and a turbine 20, provide power to the high voltage main bus 22 for distribution to the power customers. Power for the auxiliaries required to start a turbine-generator set is taken from the main bus 22, via breaker 24 and transformer 26, to create at bus 28 a typically 4160 V (60 Hz, 3-phase) distribution. From this 4160 V supply bus 28, the motorized generator starting system 30 is powered over breaker 32 to bus 34. Also connected from supply bus 28 is the parking bus system — via a breaker 38 and a transformer 40, which steps the 4160 V potential down to 480 V (60 Hz, 3-phase), and provides same via bus 98 to the parking bus power supply and control 42.

Considering the representative turbine-generator set 10, we may for purposes of concrete illustration assume that set 10 is initially at rest, and it is desired to actuate and bring the generator up to full speed — so that its full generating capacity may be applied to the main power transmission bus 22. In accordance with this aspect of the present invention, the system 10 is so arranged that the generator 18 may initially function as a synchronous motor — so as to initiate drive of turbine 20 and continue same until the turbine is brought to a sufficient rotational velocity to assure that its operation will thereafter be self-sustained. Thus in a typical instance, generator 18 will itself be so driven as to enable turbine 20 to reach a typical rotational velocity of the order of 2200 rpm, after which the turbine may bring generator 18 (which turbine 20 thereupon drives) up to full speed. The principle of utilizing the generator portion of a turbine-generator set in this manner, is not per se of the present invention; this concept (as so far expressed) is well-known in the prior art. Reference may usefully be had in this connection e.g. to U.S. Pat. No. 3,764,815.

To start the set 10, either by automatic means by a sequencer, or manually, disconnect 44 is closed and breakers 32 and 24 closed to provide 4160 V power to the motorized generator starting system 30. Control signals enabling these operations are provided by switching logic 50 via control lines 45, 25 and 90. Starting system 30 is a relatively conventional commercial device, produced by many companies throughout the world, including e.g. Brown Boveri. The said device basically consists of a pair of series-related elements; namely, a rectifier and an inverter. The rectifier thus converts the input AC power into DC form; and the inverter converts the DC signal back into an AC output at a frequency which may be selectively varied — by means well-known in the art, such as, for example, by regulating the firing rate of thyristors forming part of the said inverter.

In order to fully appreciate the significance of the present invention, it must be borne in mind that the motorized generator starting system 50, is a highly sophisticated device, of commensurate high cost and complexity. In accordance with a principal objective of the invention, it therefore is highly desirable to limit the number of devices of this type in the power plant environment, to a bare minimum. Thus in accordance with the present invention, but a single system of this type is so required.

The controllable variable frequency output from system 30 is provided by line 51 to the starting bus 52, and is thus connected to the stator of generator 18 via line 84 and a breaker 54. In the starting mode, the generator is disconnected from main bus 22 in that breaker 56 and disconnect 58 are open. These functions may be brought about via signals provided by control lines 57 and 59, proceeding from logic 50. A feedback signal from the generator, indicative of the pole position of the rotor, is used to regulate the phase switching and apply DC pulses from starter system 30 as a function of the rotor position, to develop the maximum of torque for turning the generator rotor and the connected turbine drive train. The rotor (field) flux is created by connecting an AC source via excitation bus 60 and breaker 62, (which may be actuated via control line 88 from logic 50) to the exciter through a rotating transformer winding in the case of a brushless type excitation system. This provides excitation when the rpm is low and the starting bus 52 voltage is too low to provide excitation. As the speed of the drive train increases, the output voltage of starting system 30 increases, and at about 2000 volts the excitation breaker 64 is closed by a signal in line 110, and rotating transformer breaker 62 opened, transferring the excitation power to the starting bus over breaker 54 (controlled by a signal in line 85) and transformer 66. With an excitation power requirement for starting which is typically 50% of the excitation power at the full generator rating, the transfer from the rotating transformer power source can typically occur at about 13 Hz. It is interesting to note that the generator terminal voltage at the shaft-turning speed of about 2 Hz, is about 1.5% of rated voltage or only 270 volts with an 18,000 volt generator. The torque generated by the generator acting as a synchronous motor, causes the drive train to accelerate. The increasing rotative speed is sensed by the feedback from the generator rotor to regulate the phase switching in synchronization to the rotor frequency.

The output proceeding from generator 18 at this point, is provided to a synchronization matching unit 70, the function of which is that of connecting an incoming generator to the power distribution network at such point in time as to assure that the incoming generator is in phase and frequency match with the power network. A unit of this type is, for example, available from the aforementioned Electric Machinery Mfg. Co. under the trade name "Synchro-Matcher". It is thus seen in the present instance that in addition to being provided with an input from generator 18 (via line 71), unit 70 also is connected by line 73 to the main bus 22.

When the desired drive train speed is reached, breaker 32 is opened by a signal via line 90 from switching logic 50, and the turbine 20 will then accelerate the drive to the network frequency. The synchronization matching unit 70 first controls the voltage regulator 72 via line 74 to match the generator terminal transformer 76 voltage to the voltage of main bus 22. The next function of the synchronization unit 70 is to sense the generator terminal alternating current frequency, and operate the speed changer of the turbine control system (via line 80), to adjust the rotative speed of the drive train to match the frequency and phase of bus 22. When the frequency, phase, and voltage have been satisfied, synchronizer unit 70 generates a signal, which proceeding via line 82 causes breaker 56 to close, thus connecting generator 18 to the network. Further advancing of the turbine set speed changer control will cause the generator to accept a portion of the network load as determined by the operator, and limited by the rating of the turbine-generator set. The rotor of the turbine will be heated by the hot steam in the case of a steam turbine, and by hot gases in the case of a gas turbine.

In the case of a shutdown, either planned (which could be a daily practice for turbine sets used for peaking duty), or caused by a network disturbance, the drive train comes to rest and is subject to the non-symmetrical temperature distributions resulting from non-uniform cooling of the casings surrounding the rotor. The result is that the rotor will bow as a result of uneven thermal expansion, until the drive train rotor temperature reaches equilibrium. In the case of large turbine-generator sets the cooling process can take days. Should a start attempt be made during the cool-down process while the rotor is bowed, a vibration can result and exceed the vibration limits of the drive train. To eliminate this condition and the resulting potential delays in availability, a turning system is employed to turn the shaft at low speed, and maintain a uniform temperature distribution during the cooling process.

The starting system 30 could (in principle) be used for the low speed turning system, typically at a 2 Hz output, yet the rating of the components in this system would not be fully utilized. In the case of multiple turbine sets at the same site, which is especially common for gas turbine sets, the use of a parking system in accordance with the principles of the invention allows a single starting system 30 to be used for a plurality of turbine-generator sets — with a resultant, significant savings in cost.

The parking bus power supply and control 42 is a fixed frequency, typically 2 Hz, inverter system with components sized to provide the turning power of the number of drive trains to be connected. A turning power in the order of five hp per drive train is typical. The control 42 is similar to that of starting system 30, except that control 42 may have a lower rating and a simplified output pulsing system — since this is a fixed frequency system versus the variable frequency system of starting system 30. The parking bus 82 which is connected to the output of control 42, thus constitutes a fixed frequency regulated power supply.

Since the primary function of parking bus 82 is one of maintaining a potential at a highly regulated frequency, as will enable low speed turning of one or more of the several turbines, it is not critical that the signal be regulated at the particular 2 Hz value mentioned. The output in general, can be stabilized at a fixed frequency in the range between about 1 and 2 Hz, in that the resulting 60–120 rpm rotational rate for the turbines, are values typically sought for cool-down purposes. In any event, it is important to an understanding of the advantages of the present invention, to appreciate that the shaft turning power required for a typical turbine-generator set of the type considered herein, e.g. a 50,000 KW set rotated a 120 rpm, is (as mentioned) only about 5 hp, whereby it will be evident that the cost and degree of sophistication required for power supply and control 42 is relatively low.

Following a shut-down the generator breaker 56 is opened, and exciter field breaker 64 opened; therefore, the voltage on the generator terminal is zero. To connect a turbine set to the parking bus 22 to provide low speed turning for cooling the turbine rotor, the following sequence is followed, manually or automatically: Breaker 54 in the line 84 from starting bus 52 is closed under control of logic 50 via a control line 85. Rotating transformer breaker 62 is then closed via a signal from logic 50 proceeding by control line 88, to excite the rotor winding. Breaker 32 is closed via a signal proceeding by control line 90, which energizes starting bus 52, and as in the case of starting the set, the drive train is accelerated from zero rpm. The speed is controlled by synchronization matching unit 92, which is provided with an input from bus 82 via lines 115 and 117, and operates the speed changer circuit of starter system 30 to match the speed of the drive train to the frequency and phase of parking bus 82. Synchronize unit 92 also can adjust the voltage of starting system 30 to match the voltage of parking bus 82; however, the closure of breaker 94 (by a control signal from logic 50 via line 96) is possible with the small mismatch of voltage between buses 52 and 82 without undue currents. Breaker 94 is now signaled (via line 112) to close by the synchronizing unit 92 — which connects generator 18 to the parking bus, and the power required to maintain the parking bus speed is supplied by bus 98 from the main network through breaker 24, transformer 26, breaker 38 and transformer 40.

The starting system breaker 32 is now opened (via control line 90) and disconnect 54 opened. The generator 18 is now isolated to the parking bus 82 and the starting system is at rest and available to start another unit or to park another unit in the power plant for shaft cooling. While parked the excitation of the rotor windings is provided from the rotating transformer, over breaker 62.

It will, of course, be evident that the additional turbine-generator sets, such as those indicated at 12, 14 and 16, may be similarly parked upon bus 82, by precisely the same sequence of operations as had been described. Similarly, it will be evident that the parking function is not exclusively useful during cool-down; but if desired, the said turbine-generator sets may be parked on the bus 82 at other times, as e.g. intermittently during the start-up operations. The various switches, which may be solenoid-actuated and corresponding connection arrangements, function for each of the said sets in the same manner as has been described for turbine-generator set 10. Accordingly, and in the interest of simplicity, reference numerals have not been associated with all of these further elements.

While the present invention has been particularly set forth in terms of specific embodiments thereof, it will be understood in view of the instant disclosure, that numerous variations upon the invention are now enabled to those skilled in the art, which variations yet reside within the scope of the instant teaching. Accordingly the invention is to be broadly construed, and limited only by the scope and spirit of the claims now appended hereto.

I claim:

1. In an electrical power generating installation including a plurality of turbine-generator sets, and a controlled varible frequency starting system for starting up the turbine-generator sets for subsequent connection to a power feeder network, the improvement comprising:
    a parking bus;
    means for providing said parking bus with a potential regulated at a relatively low and constant frequency in the range of from about 1 to 2 Hz;
    switching means for connecting a selected turbine-generator set to said starting system;
    means for controlling the frequency of said starting system to bring said selected turbine-generator set to the approximate rotational speed corresponding to the frequency on said parking bus;
    phase and frequency matching means for determining the presence of a phase and frequency match between said driven selected set and said parking bus; and
    second switching means responsive to said phase and frequency match for switching the generator of said selected turbine-generator set from said starting system to said parking bus whereby said selected turbine-generator set may thereafter be rotated at said low speed by power provided through said parking bus.

2. A system in accordance with claim 1, wherein each generator member of said plurality of turbine-generator sets are connectable in parallel to said parking bus, wherein a plurality of said turbine-generator sets may be simultaneously rotated at said low speed configuration.

3. In an electrical power generating installation of the type including a plurality of turbine-generator sets; a controlled variable frequency starting system; means for connecting the output from said starting system to the generator member of a selected turbine-generator pair for gradually increasing the frequency output of said starting system whereby to drive said generator as a synchronous motor to bring said turbine to a self-sustaining rotational velocity; means for disconnecting said generator from said system upon said turbine becoming self-sustaining; a power feeder network; and synchronization matching means for connecting said generator to said power feeder network upon a phase and frequency match being attained between said generator and power feeder network; the improvement enabling a single said starting system to be utilized in effecting transfer to a selected turbine-generator set to a low-speed turning configuration comprising:
    parking bus means;
    means for providing a potential to said parking bus means at a relatively constant, low frequency;
    switching means for disconnecting a selected turbine-generator set from said power feeder network and for re-connecting said turbine-generator set to said starting system;
    means for gradually reducing the frequency of said starting system output to gradually slow rotation of said turbine-generator set;
    means for matching the phase and frequency of rotation of said selected turbine-generator set to the corresponding phase and frequency of said parking bus; and
    means for switching and connecting the generator member of said selected turbine-generator set to said parking bus, to continue low speed turning of said selected turbine-generator set and for switching and reconnecting the generator member of said selected turbine-generator set to said starting system to bring said turbine-generator set into operating condition for reuse.

4. A system in accordance with claim 3, wherein each generator member of said plurality of turbine-generator sets are connectable in parallel to said parking bus, whereby a plurality of said turbine-generator sets may be simultaneously rotated at said low speed configuration.

5. A system in accordance with claim 3, wherein the relatively constant, low frequency potential provided to said parking bus is maintained at a value in the range of from about 1 to 2 Hz.

6. In an electrical power generating installation including a plurality of turbine-generator sets; a system for starting up selected turbine-generator sets and for enabling low speed, relatively constant angular velocity rotation of said sets for cool-down or other purposes; said system comprising:
    a variable frequency motorized generator starting system;
    means for connecting the output from said starting system to the generator member of a turbine-generator set selected for startup, to enable driving of said generator as a synchronous motor while gradually increasing the frequency of said power supply output to thereby bring said turbine to a self-sustaining rotational velocity;

means for disconnecting said generator from said starting system upon said turbine becoming self-sustaining;

a power feeder network;

synchronization matching means connected to said power feeder network and to the output from said generator for effecting connection of said generator to said network upon a phase and frequency match being attained between the two;

parking bus means;

means for providing a potential to said parking bus at a substantially constant, relatively low frequency;

means for disconnecting a selected turbine-generator set from said power feeder network and re-connecting said set to said starting system for gradually slowing rotation of said turbine-generator set by reducing the frequency of said starting system output;

means for matching the phase and frequency of rotation of said selected turbine-generator set being driven by said starting system, to the corresponding phase and frequency of said parking bus; and means for thereupon connecting the generator member of said turbine-generator set to said parking bus, to effect continuing low-speed turning of said selected turbine-generator set.

7. In an electrical power generating installation of the type including a plurality of turbine-generator sets, and a controlled variable frequency starting system for starting up said turbine-generator sets by driving the generator members thereof as synchronous motors until speeds are reached at which said turbines are self-sustaining; a method enabling a single said starting system to be utilized in effecting transfer of a selected turbine-generator set at a low speed turning configuration for cooling or the like, comprising:

a. providing a parking bus carrying a relatively constant and low-frequency potential thereon;

b. disconnecting said selected turbine-generator set from the power feeder network and re-connecting said set to said starting system;

c. gradually reducing the frequency of said starting system output to gradually slow rotation of said selected set;

d. matching the phase and rotational frequency of said selected set to the corresponding phase and frequency of said parking bus;

e. transferring the generator member of said set to said parking bus upon said match being attained; and f. thereafter continuing low speed turning of said set by driving said generator through said parking bus.

8. A method in accordance with claim 7, including repetition of steps (b) through (f), whereby to park a plurality of said sets upon said parking bus; and thereupon continuing to drive said plurality of sets in parallel through said bus.

9. A method in accordance with claim 8, wherein at least three of said sets are so driven in parallel.

10. A method in accordance with claim 7, wherein the frequency of said potential is maintained at a relatively constant value in the range of from about 1 to 2 Hz.

11. In an electrical power generating installation of the type including a plurality of turbine-generator sets, and a controlled variable frequency starting system for starting up said turbine-generator sets by driving the generator members thereof as synchronous motors until speeds are reached at which said turbine is self-sustaining; a method enabling a single said starting system to be utilized for both said start-up functions, and for enabling slow turning of a plurality of said sets for a sustained period for cooling or other purposes, said method comprising:

a. providing a parking bus carrying a relatively constant and low frequency potential thereon;

b. utilizing said starting system to bring a selected turbine-generator set to the approximate rotational speed corresponding to the frequency maintained on said parking bus;

c. matching the phase and rotational frequency of said selected set to the corresponding phase and frequency of said parking bus; and d. electrically transferring the generator member of said set to said parking bus upon said match being attained, and thereafter continuing low speed turning of said set by driving said generator as a synchronous motor through said parking bus potential.

* * * * *